(12) United States Patent
Hinderthür et al.

(10) Patent No.: US 11,582,539 B2
(45) Date of Patent: Feb. 14, 2023

(54) METHOD AND APPARATUS FOR MANAGEMENT OF A SPECTRAL CAPACITY OF A WAVELENGTH DIVISION MULTIPLEXING SYSTEM

(71) Applicant: ADVA Optical Networking SE, Meiningen OT Dreissigacker (DE)

(72) Inventors: Henning Hinderthür, Finning (DE); Cornelius Fuerst, Fuerstenfeldbruck (DE); Paul Morkel, Dallas, TX (US); Christophe Meyer, Meiningen (DE); Christian Scheerer, Neuried (DE)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 0 days.

(21) Appl. No.: 17/355,094

(22) Filed: Jun. 22, 2021

(65) Prior Publication Data
US 2021/0409847 A1   Dec. 30, 2021

(30) Foreign Application Priority Data
Jun. 26, 2020   (EP) .................................... 20182519

(51) Int. Cl.
*H04J 14/02* (2006.01)
*H04Q 11/00* (2006.01)

(52) U.S. Cl.
CPC ...... *H04Q 11/0005* (2013.01); *H04J 14/0212* (2013.01); *H04Q 2011/002* (2013.01); *H04Q 2011/0016* (2013.01)

(58) Field of Classification Search
CPC .................................................. H04J 14/0216
See application file for complete search history.

(56) References Cited

U.S. PATENT DOCUMENTS

| | | | |
|---|---|---|---|
| 6,243,177 B1 | 6/2001 | Duerksen | |
| 6,751,414 B1* | 6/2004 | Davies | H04B 10/2563 398/41 |
| 2001/0019449 A1* | 9/2001 | Krummrich | H04B 10/2972 359/341.2 |
| 2018/0083697 A1 | 3/2018 | Thomas et al. | |
| 2020/0076508 A1 | 3/2020 | Jia et al. | |
| 2020/0119812 A1* | 4/2020 | Nakamura | H04B 10/298 |
| 2020/0295526 A1* | 9/2020 | Peng | H01S 3/2316 |

OTHER PUBLICATIONS

"Elastic Optical Networks", edited by López et al., Springer, 2016 (Year: 2016).*
European Search Report corresponding to European Application No. EP20182519.7 dated Jan. 11, 2021.

* cited by examiner

*Primary Examiner* — Shi K Li
(74) *Attorney, Agent, or Firm* — Jenkins, Wilson, Taylor & Hunt, P.A.

(57) ABSTRACT

An apparatus for management of a spectral capacity of a wavelength division multiplexing, WDM, system includes at least one pair of transmission fibers provided for transporting optical signals. Each transmission fiber of a transmission fiber pair is connected to a first port of an optical circulator having at least two additional ports and adapted to transmit an incoming optical signal entering one of its ports via its next port. WDM subsystems configured with counter-propagating assignable wavelengths are connected to associated ports of the optical circulator of the apparatus.

17 Claims, 7 Drawing Sheets

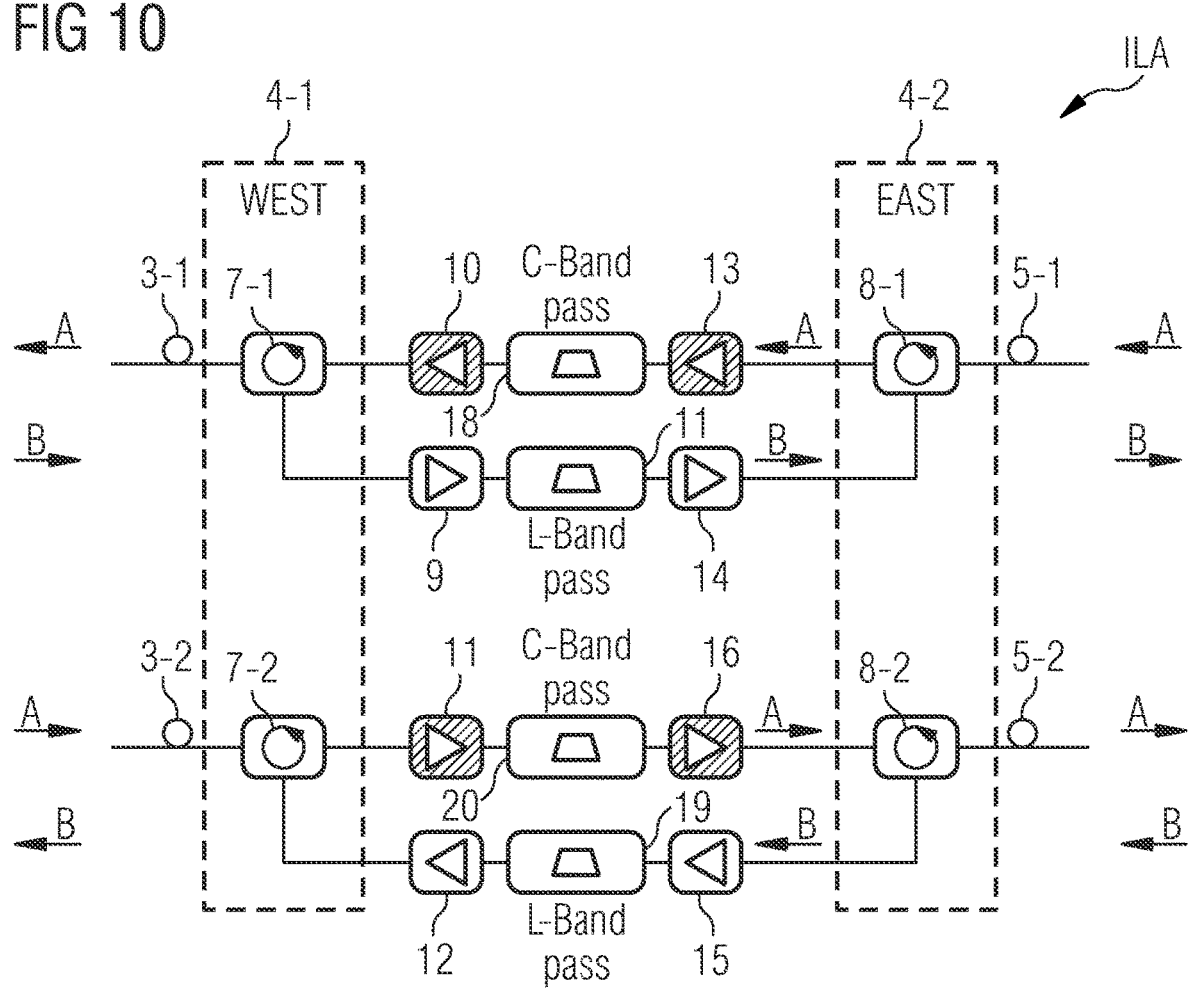

METHOD AND APPARATUS FOR MANAGEMENT OF A SPECTRAL CAPACITY OF A WAVELENGTH DIVISION MULTIPLEXING SYSTEM

A method and apparatus for management of a spectral capacity of a wavelength division multiplexing system

RELATED APPLICATIONS

This application claims the priority benefit of European Patent Application No. 20182519.7, filed Jun. 26, 2020, the disclosure of which is incorporated herein by reference in its entirety.

TECHNICAL FIELD

The invention relates to a method and apparatus for management of a spectral capacity of a wavelength division multiplexing, WDM, system by means of directional coupling.

TECHNICAL BACKGROUND

Wavelength division multiplexing, WDM, is a fiber optic transmission technique that enables the use of multiple light wavelength to transmit data over the same physical medium. Two or more colors of light can travel on one optical fiber. A conventional WDM system comprises a multiplexer at a transmitter side to join the several optical signals together and a demultiplexer at the receiver side to split the received optical signals. Optical add-drop multiplexers can be used in the wavelength division multiplexing system for multiplexing and routing different channels of light into or out of a single mode fiber (SMF). Channels that directly pass the optical add-drop multiplexer can be termed as cut-through lightpaths while those that are added or dropped at the optical add-drop multiplexer are termed added/dropped lightpaths. An optical add-drop multiplexer can for example be implemented by fiber Bragg gratings FBG and optical circulators. An optical circulator comprises a three- or four-port optical device designed such that light entering at any port does exist from the next port of the optical circulator. Fiber optic circulators can be used to separate optical signals that travel in opposite directions in an optical fiber, for example to achieve bidirectional transmission over a single optical fiber.

Operators of an optical network comprising a wavelength division multiplexing system often face the challenge to extend their existing optical transport network. For example, sometimes an optical network may run into a capacity bottleneck with regard to the maximum number of available wavelengths. Further, existing optical networks may sometimes not be optimized with respect to their performance for coherent interfaces. Also, existing network elements of the optical network can miss state-of-the-art features like high port count, reconfigurable optical add-drop multiplexers or flexgrid passband support.

In many situations, it is preferable to extend an existing optical system instead of a complete greenfield deployment of an optical system. The reason for this is that a greenfield deployment of a new optical system requires an additional fiber infrastructure. Consequently, the extension of an existing optical system requires less additional hardware. Further, in a system extension scenario, for instance, free rack space, e.g. open slots in existing shelves, can be used more effectively. This in turn reduces overall footprint and power consumption. Further, in a system extension scenario, the already implemented network management solutions can be continued and potentially no additional network elements with additional IP addresses need to be introduced.

In particular, in a situation where an existing optical network using wavelength division multiplexing has to be extended, the management of the spectral capacity of the wavelength division multiplexing system becomes relevant. There are conventional ways to present an available spectrum to physical ports.

FIGS. 1A, 1B illustrate a conventional filter-based approach. A filter is used to select two frequency bands A, B. The selection between the two wavelength bands can be fixed controllable. Although the filter comprises a low insertion loss, the provided coupling is inflexible.

FIGS. 2A, 2B illustrate a WSS-based approach. Here, a wavelength selective switch WSS can be used to select individually the wavelength of the system. This allows for a flexible selection of the wavelength. However, a wavelength selective switch WSS comprises relatively high insertion losses, e.g. an insertion loss of 5 to 10 dB.

FIGS. 3A, 3B illustrate a conventional coupler-based approach. Also, the coupler provides a moderate insertion loss.

Accordingly, there is a need to provide a method and apparatus for management of a spectral capacity of a wavelength division multiplexing, WDM, system which provides a minimum insertion loss and a maximum flexibility with respect to the managed wavelength at the same time.

SUMMARY OF THE INVENTION

The invention provides according to a first aspect an apparatus for management of a spectral capacity of a wavelength division multiplexing, WDM, system comprising at least one pair of transmission fibers provided for transporting optical signals, wherein each transmission fiber of a transmission fiber pair is connected to a first port of an optical circulator having at least two additional ports and adapted to transmit an incoming optical signal entering one of its ports via its next port, wherein wavelength division multiplexing, WDM, subsystems configured with counter-propagating assignable wavelengths are connected to associated ports of the optical circulator of said apparatus.

The directional coupling provided by the circulator combines the two advantages of low loss coupling of the WDM subsystems and free access to any wavelengths on the system ports. The apparatus provides free access to any wavelengths on the two system ports, i.e. without predetermination of wavelength in contrast to a filter approach as illustrated in FIGS. 1A, 1B. The use of an optical circulator has the advantage that the insertion loss is minimal. The used optical circulator can comprise a low insertion loss of less than 1 dB.

In a possible embodiment of the apparatus according to the first aspect of the present invention, the apparatus comprises a first optical circulator having a first port connected to a first transmission fiber of said transmission fiber pair, a second port connected to a receiving side (Rx) of a first WDM subsystem (A) and a third port connected to a transmitting side (Tx) of a second WDM subsystem (B) and a second optical circulator having a first port connected to a second transmission fiber of said transmission fiber pair, a second port connected to a transmitting side (Tx) of the first WDM subsystem (A) and a third port connected to a receiving side (Rx) of the second WDM subsystem (B).

In a possible embodiment of the apparatus according to the first aspect of the present invention, both the first optical circulator and the second optical circulator comprise a low insertion loss of less than 1 dB.

In a possible embodiment of the apparatus according to the first aspect of the present invention, the apparatus is integrated in a terminal node of the wavelength division multiplexing system.

In a further possible embodiment of the apparatus according to the first aspect of the present invention, the apparatus integrated in the terminal node of the WDM system is connected via the pair of transmission fibers and via at least one inline amplifier node of the WDM system to another terminal node of the WDM system.

In a possible embodiment of the apparatus according to the first aspect of the present invention, the inline amplifier node of the WDM system comprises for each transmission fiber of a transmission fiber pair connecting the inline amplifier node with a terminal node of the WDM system an optical circulator having a first port connected to the respective transmission fiber and having at least two additional ports and being adapted to transmit an incoming optical signal entering one of its ports via its next port.

In a further possible embodiment of the apparatus according to the first aspect of the present invention, the inline amplifier node of the WDM system comprises a West interface provided to connect the inline amplifier node by means of a first fiber pair to a first terminal node of the WDM system and an East interface provided to connect the inline amplifier node by means of a second fiber pair to a second terminal node of the WDM system.

In a further possible embodiment of the apparatus according to the first aspect of the present invention, both interfaces of the inline amplifier node comprise for each transmission fiber of the fiber pair connected to the respective interface an associated optical circulator.

In a further possible embodiment of the apparatus according to the first aspect of the present invention, each interface of the inline amplifier node comprises a first optical circulator and a second optical circulator, wherein the first optical circulator has a first port connected to a first transmission fiber of the respective fiber pair, a second port adapted to transmit an incoming optical signal received at the first port to an input of a first optical amplifier which is connected to the second port and is adapted to amplify the optical signal received from the second port and having a third port connected to an output of a second optical amplifier and adapted to transmit an amplified optical signal received from the second optical amplifier to the first port of the first optical circulator, wherein the second optical circulator has a first port connected to a second transmission fiber of the respective fiber pair, a second port adapted to transmit an incoming optical signal received at the first port to an input of a third optical amplifier which is connected to the second port and is adapted to amplify the optical signal received from the second port and having a third port connected to an output of a fourth optical amplifier and adapted to transmit an amplified optical signal received from the fourth optical amplifier to the first port of the second optical circulator.

In a further possible embodiment of the apparatus according to the first aspect of the present invention, the output of the first optical amplifier and the output of the third optical amplifier are connected to associated controllable wavelength selective switches, WSS, or associated bandpass filters, wherein the input of the second optical amplifier and the input of the fourth optical amplifier are connected to associated controllable wavelength selective switches, WSS, or associated bandpass filters.

In a further possible embodiment of the apparatus according to the first aspect of the present invention, the WDM subsystems comprise WDM subsystems for different predefined frequency bands.

In a further possible embodiment of the apparatus according to the first aspect of the present invention, the WDM subsystems comprise WDM subsystems for a standard or an extended frequency band.

In a further possible embodiment of the apparatus according to the first aspect of the present invention, the WDM subsystems comprise WDM subsystems for different non-overlapping sets of WDM carrier frequencies.

In a still further possible embodiment of the apparatus according to the first aspect of the present invention, the WDM subsystems comprise flexgrid WDM subsystems.

In a further possible embodiment of the apparatus according to the first aspect of the present invention, the optical amplifiers comprise doped fiber amplifiers.

The invention provides according to a further aspect a wavelength division multiplexing, WDM, system comprising the features of claim 16.

The invention provides according to the second aspect a wavelength division multiplexing, WDM, system comprising terminal nodes each having an integrated apparatus according to the first aspect of the present invention connected via transmission fiber pairs and at least one inline amplifier node to another terminal node of the wavelength division multiplexing, WDM, system.

The invention further provides according to a third aspect a method for managing a spectral capacity of a wavelength division multiplexing, WDM, system comprising the features of claim 17.

The invention provides according to the third aspect a method for managing a spectral capacity of a wavelength division multiplexing, WDM, system comprising at least one pair of transmission fibers provided for transporting optical signals, wherein each transmission fiber of a transmission fiber pair is connected to a first port of an optical circulator having at least two additional ports and which transmits an incoming optical signal entering one of its ports via its next port, wherein WDM subsystems configured with counter-propagating assigned wavelengths are connected to associated ports of the optical circulator.

BRIEF DESCRIPTION OF THE FIGURES

In the following, possible embodiments of the different aspects of the present invention are explained in detail with reference to the enclosed figures.

FIG. 10 shows a further exemplary embodiment of an apparatus according to the present invention.

DETAILED DESCRIPTION OF EMBODIMENTS

Figure 1A:
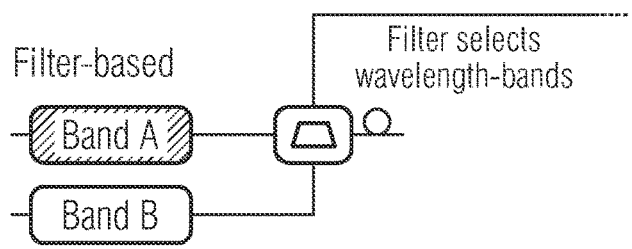
FIGS. 1A, 1B illustrate a conventional spectral management approach.
Figure 1B:
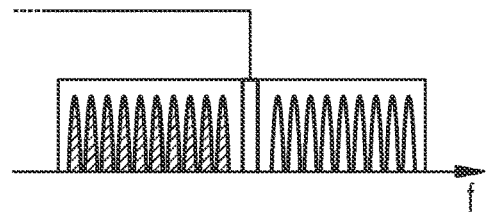
Figure 2A:
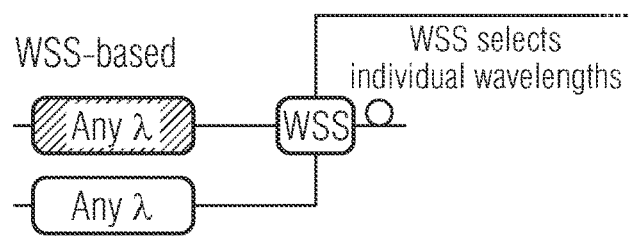
FIGS. 2A, 2B illustrate a further conventional spectral management approach.
Figure 2B:
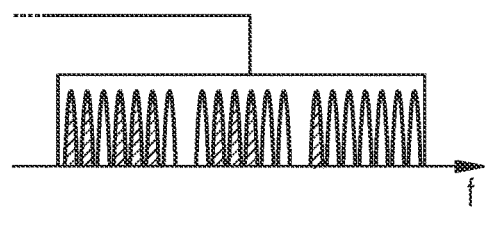
Figure 3A:
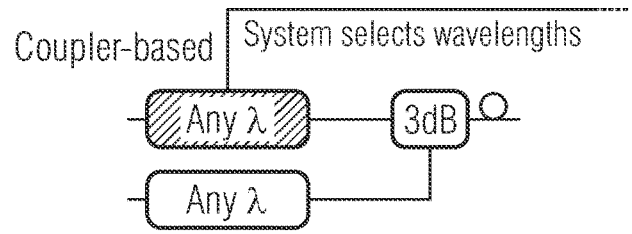
FIGS. 3A, 3B illustrate a further conventional spectral management approach.
Figure 3B:
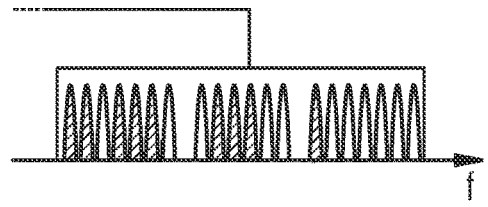
Figure 4A:
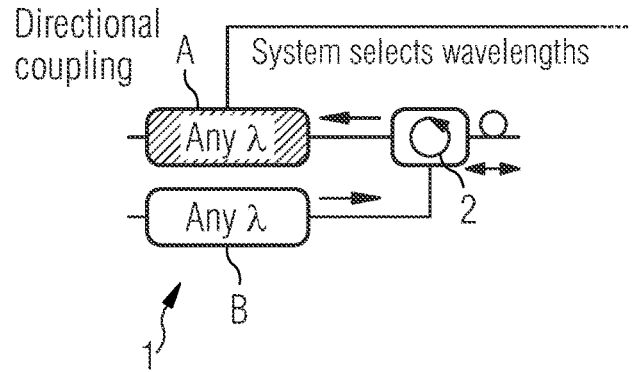
FIGS. 4A, 4B illustrate a directional coupling spectral management approach employed by the method and apparatus according to the present invention.
Figure 4B:
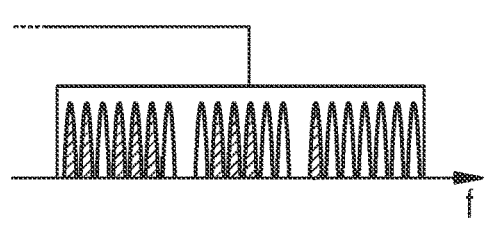

FIGS. 4A, 4B illustrate a directional coupling as performed by an apparatus 1 according to the first aspect of the present invention. The apparatus 1 is provided for performing management of a spectral capacity of a wavelength division multiplexing, WDM, system. The apparatus 1 comprises an optical circulator 2 comprising in the illustrated embodiment three physical ports. The wavelength division multiplexing, WDM, system as shown in FIG. 4A comprises at least one pair of transmission fibers provided for transporting optical signals. Each transmission fiber of a transmission fiber pair 3 is connected to a first port of the optical circulator 2 having at least two additional ports. The optical circulator 2 is adapted to transmit an incoming optical signal entering one of its ports via its next port. The two illustrated WDM subsystems A, B are configured with counter-propagating assignable wavelengths which are connected to associated ports of the optical circulator 2 of the apparatus 1. The optical circulator 2 comprises a low insertion loss of less than 1 dB. In the WDM system the correct wavelength can be selected.

Figure 5:
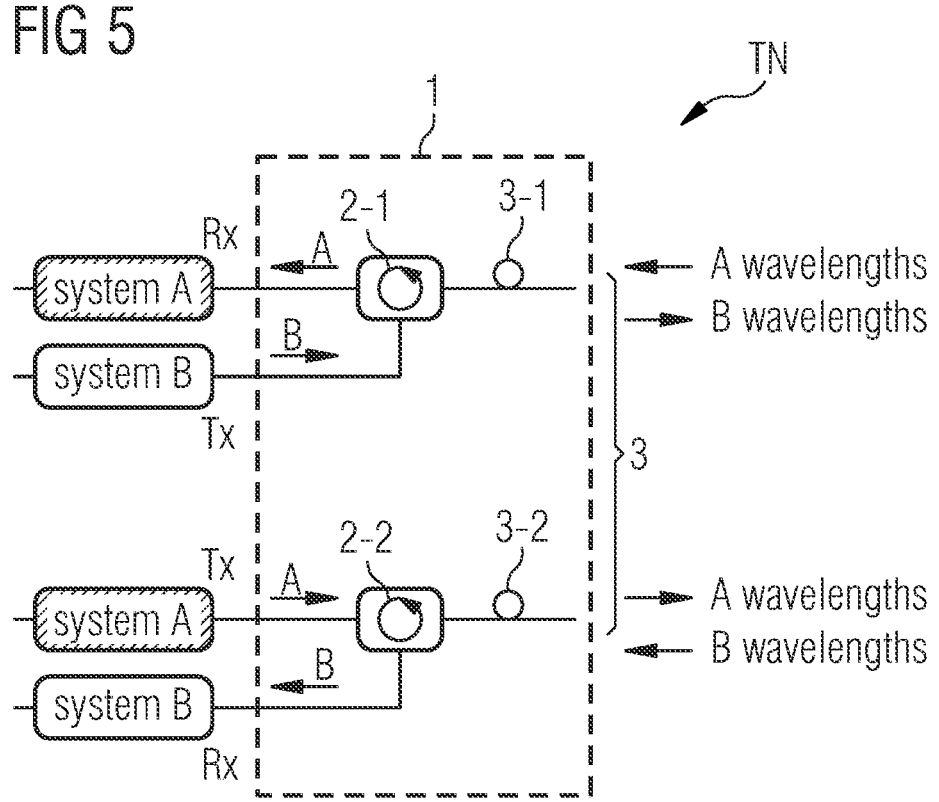
FIG. 5 shows a block diagram for illustrating a possible exemplary embodiment of an apparatus according to the present invention.

The directional coupling illustrated in FIGS. 4A, 4B can be used in a terminal node configuration as shown in FIG. 5. In the illustrated embodiment, the apparatus 1 is integrated in a terminal node TN of the WDM system. The terminal node TN comprises a first optical circulator 2-1 and a second optical circulator 2-2. The first optical circulator 2-1 has a first port connected to a first transmission fiber 3-1 of a transmission fiber pair 3, a second port connected to a receiving side (Rx) of a first WDM subsystem A and a third port connected to a transmitting side (Tx) of a second WDM subsystem B. The apparatus 1 integrated in the terminal node TN as shown in FIG. 5 comprises a second optical circulator 2-2 having a first port connected to a second transmission fiber 3-2 of the transmission fiber pair 3, a second port connected to a transmitting side (Tx) of the first WDM subsystem A and a third port connected to a receiving side (Rx) of the second WDM subsystem B. Accordingly, for each of the two transmission fibers 3-1, 3-2 of the transmission fiber pair 3, an optical circulator 2-1, 2-2 is provided between the WDM subsystem and the optical fiber.

The WDM subsystem B is configured such that the propagation direction of the wavelength is always in opposite direction relative to the WDM subsystem A (counter-propagating).

The wavelength sets of the two WDM subsystems A and B consequently correspond to different ports of the two optical circulators 2-1, 2-2.

In a possible embodiment, wavelength selective components like wavelength selective switches WSS or filter elements can be associated with the WDM subsystems A and B to provide additional isolation between the two wavelength sets A and B. This has the benefit that back-reflected light can be blocked from the other WDM subsystem.

The idea underlying the apparatus 1 and method according to the present invention is to connect the two different WDM subsystems A and B to the same optical fiber using propagation direction of the light as the main criterion to select traffic between the two WDM subsystems A and B.

The apparatus 1 integrated in the terminal node TN as shown in FIG. 5 can be connected via the pair of transmission fibers 3 and via at least one inline amplifier node ILA of the WDM subsystem to another terminal node TN of the WDM system. An inline amplifier node ILA of the WDM system may comprise for each transmission fiber 3-1, 3-2 of the transmission fiber pair 3 a first port connected to the respective transmission fiber and having at least two additional ports and being adapted to transmit an incoming optical signal entering one of its ports via its next port.

Figure 6:
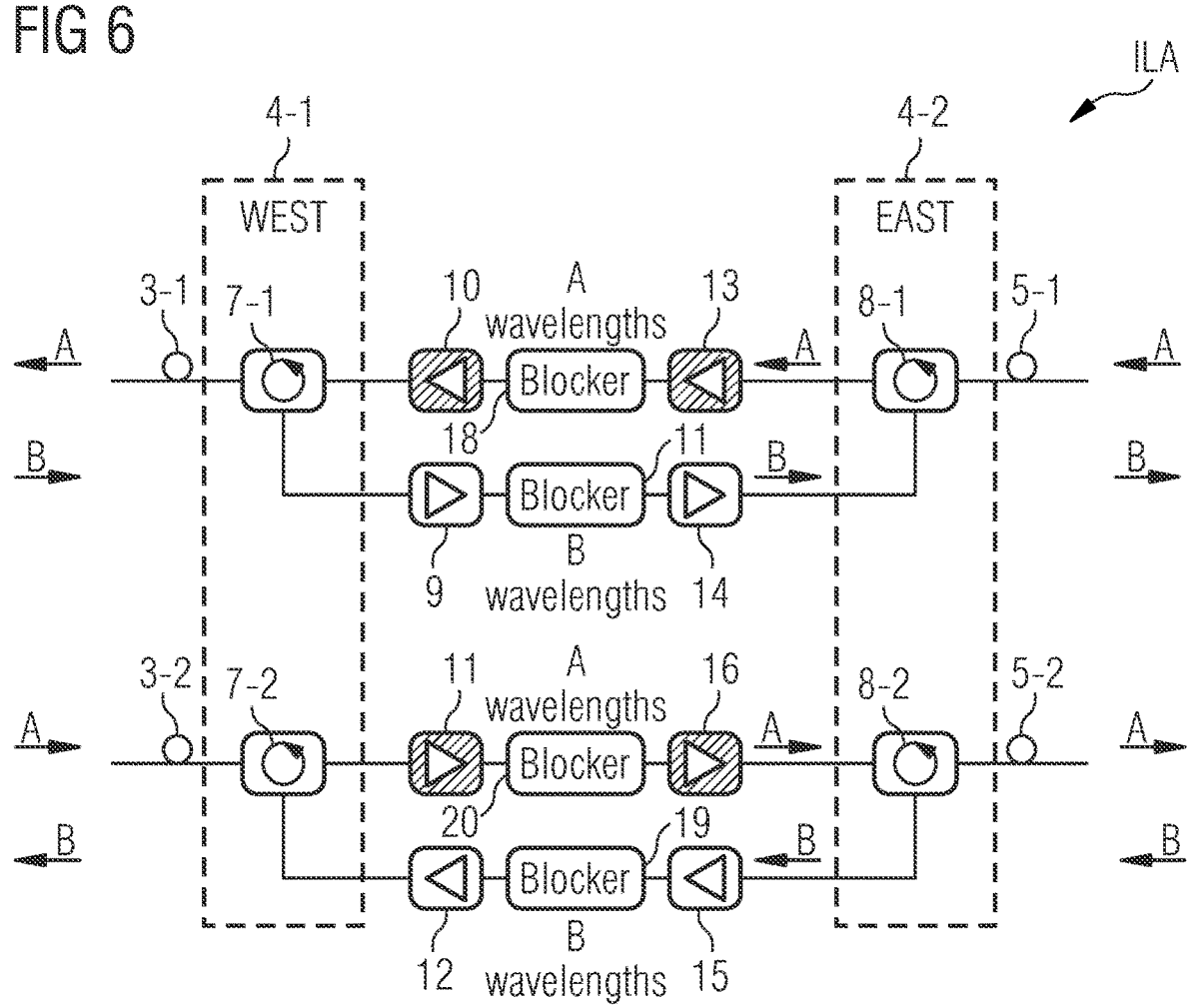
FIG. 6 shows a block diagram of a further possible exemplary embodiment of an apparatus according to the first aspect of the present invention.

FIG. 6 shows a block diagram of a possible exemplary embodiment of an inline amplifier node ILA used by a WDM system according to the present invention. The inline amplifier node ILA as illustrated in the embodiment of FIG. 6 comprises a West interface 4-1 and an East interface 4-2. Both interfaces 4-1, 4-2 comprise two optical circulators. The West interface 4-1 of the inline amplifier node ILA is provided to connect the inline amplifier node ILA by means of a first fiber pair 3-1, 3-2 to a first terminal node of the WDM system as illustrated in FIG. 5. The East interface 4-2 of the inline amplifier node ILA is provided to connect the inline amplifier node ILA by means of a second fiber pair 5-1, 5-2 to another terminal node of the WDM system. Both interfaces 4-1, 4-2 of the inline amplifier node ILA shown in the embodiment of FIG. 6 comprise for each transmission fiber of the respective fiber pair an associated optical circulator. In the embodiment shown in FIG. 6, the inline amplifier node ILA comprises four optical circulators. A first pair of optical circulators 7-1, 7-2 is provided for the West interface 4-1 and a second pair of optical circulators 8-1, 8-2 is provided for the East interface 4-2 of the inline amplifier node ILA. The optical circulator 7-1 of the West interface 4-1 comprises three ports. The optical circulator 7-1 comprises a first port connected to the first transmission fiber 3-1 of the transmission fiber pair 3. The second port of the optical circulator 7-1 is adapted to transmit an incoming optical signal received at the first port to an input of a first optical amplifier 9 which is connected to the second port of the optical circulator 7-1 and adapted to amplify the optical signal received from the second port of the optical circulator 7-1.

The optical circulator 7-1 of the West interface 4-1 further comprises a third port connected to an output of a second optical amplifier 10. The third port of the circulator 7-1 connected to the output of the second optical amplifier 10 is adapted to transmit an amplified optical signal received from the second optical amplifier 10 to the first port of the first optical circulator 7-1 connected to the optical fiber 3-1.

The West interface 4-1 of the inline amplifier node ILA comprises a second optical circulator 7-2 as illustrated in FIG. 6. The second optical circulator 7-2 comprises a first port connected to the second transmission fiber 3-2 of the first fiber pair 3. The second optical circulator 7-2 of the West interface 4-1 further comprises a second port adapted to transmit an incoming optical signal received at the first port to an input of a third optical amplifier 11 which is connected to the second port of the optical circulator 7-2 and is adapted to amplify the optical signal received from the second port of the optical circulator 7-2. As also illustrated in FIG. 6, the second optical circulator 7-2 comprises a third port connected to an output of a fourth optical amplifier 12 and is adapted to transmit an amplified optical signal received from the fourth optical amplifier 12 to the first port of the second optical circulator 7-2 connected to the optical fiber 3-2.

The other optical interface of the inline amplifier node ILA as illustrated in FIG. 6, i.e. the East interface 4-2, has a corresponding structure. The East interface 4-2 of the inline amplifier node ILA also comprises two optical circulators 8-1, 8-2 each having three ports. The first optical circulator 8-1 of the East interface 4-2 has a first port connected to a first transmission fiber 5-1 of a transmission fiber pair 5. The first optical circulator 8-1 of the East interface 4-2 comprises a second port adapted to transmit an incoming optical signal received at the first port of the first optical circulator 8-1 to an input of a first optical amplifier 13 which is connected to the second port of the optical circulator 8-1 and is adapted to receive the optical signal received from the second port. The first optical circulator 8-1 further comprises a third port connected to an output of a second optical amplifier 14 and adapted to transmit an amplified optical signal received from the second optical amplifier 14 to the first port of the first optical circulator 8-1 connected to the optical fiber 5-1.

The East interface 4-2 of the inline amplifier node ILA comprises a second optical circulator 8-2 having a first port connected to the second transmission fiber 5-2 of the fiber pair 5. The optical circulator 8-2 has a second port adapted to transmit an incoming optical signal received at the first port to an input of a third optical amplifier 15 which is connected to the second port and is adapted to amplify the optical signal received from the second port of the optical circulator 8-2. The second optical circulator 8-2 comprises a third port connected to the output of a fourth optical amplifier 16 and adapted to transmit an amplified optical signal received from the fourth optical amplifier 16 to the first port of the second optical circulator 8-2 of the East interface 4-2 connected to the second fiber 5-2 of the optical transmission fiber pair 5.

As can be seen in the block diagram of FIG. 6, the optical amplifiers for the wavelength sets A and B of the two WDM subsystems operate always counterwise.

In the illustrated embodiment of FIG. 6, the wavelength of wavelength set B belonging to a WDM subsystem B can be transported via the first optical fiber 3-1 to the first port of the first optical circulator 7-1 of the West interface 4-1. From there, the B-wavelength is forwarded via the second port of the optical circulator 7-1 to the input of the optical amplifier 9 through a wavelength blocking component 17 provided for A-wavelengths and the optical amplifier 14 to the third port of the optical circulator 8-1 of the East interface 4-2 for-warding the received B-wavelength to the first port connected to the optical fiber 5-1 of the optical transmission fiber pair 5. Accordingly, the B-wavelength of the WDM subsystem B received at the first port of the optical circulator 7-1 is output at the first port of the opposing optical circulator 8-1 to travel to another terminal node TN of the WDM system. The A-wavelengths of the other WDM subsystem A travel in opposite direction. The A-wavelength of the A-WDM subsystem can be received by the first port of the optical circulator 8-1 and forwarded to the optical amplifiers 13, 10 separated by a wavelength blocking component 18 for blocking the B-wavelength of the other WDM subsystem B to be forwarded by the optical circulator 7-1 to the optical fiber 3-1 of the fiber transmission pair 3.

Summarizing, in the upper branch of the inline amplifier node ILA illustrated in FIG. 6, the A-wavelengths travel from East to West whereas the B-wavelengths of the other WDM subsystem B travel from West to East within the inline amplifier node ILA.

In the lower branch of the inline amplifier node ILA, the direction of the A- and B-wavelengths is performed in the opposing direction. Accordingly, in the lower branch of the inline amplifier node ILA, the A-wavelengths of the WDM subsystem A travel from West to East whereas the B-wavelengths of the WDM subsystem B travel from East to West.

The A-wavelengths received at the first port of the optical circulator 7-2 are forwarded to the optical amplifiers 11, 16 separated by a wavelength blocking component 20 provided for blocking the B-wavelengths and forwarded by the optical circulator 8-2 of the East interface 4-2 to the optical fiber 5-2. On the other hand, the B-wavelengths received via the optical fiber 5-2 are forwarded by the optical circulator 8-2 via the optical amplifiers 15, 12 separated by a wavelength blocking component 19 for blocking the wavelength and via the optical circulator 7-2 to the optical fiber 3-2 of the other optical fiber pair 3.

In the embodiment shown in FIG. 6, the optical amplifiers integrated in the inline amplifier node ILA and used for amplifying the wavelengths of the same WDM subsystem (A, B) can be separated by wavelength blocking components 17, 18, 19, 20 used to block wavelengths of the other WDM subsystem. As shown in the embodiment of FIG. 6, the inline amplifier node ILA comprises four wavelengths blocking components 17, 18, 19, 20. For instance, the output of the optical amplifier 9 and the optical amplifier 15 used for amplifying B-wavelengths of the WDM subsystem B are connected to associated controllable wavelength selective switches 17, 19 used for blocking wavelengths of the other WDM subsystem A. Further, the input of the optical amplifier 14 and the input of the optical amplifier 12 both used for amplifying B-wavelengths of the WDM subsystem B can be connected to associated controllable wavelength switches or blocking components 17, 19 used to block or filter wavelengths or frequencies of the WDM subsystem A.

The blocking components 17 to 20 as shown in the illustrated embodiment of FIG. 6 can be provided to reduce back reflections which may create multipath interferences. The wavelength blocking units can be based on software-controlled WSS technology and can be used to suppress back-reflected light before entering the respective amplification stage.

The blocking components provided in a signal path of the A-wavelengths of the first WDM subsystem A are provided for blocking any wavelengths of the other wavelength set B of the other WDM subsystem B. In the same manner, a blocking component provided in the signal path of the second WDM subsystem B is provided to block any wavelengths of the other wavelength set A of the WDM subsystem A. In the illustrated embodiment, the wavelength blocking units are provided between two amplification stages or optical amplifiers used for the other WDM subsystem. In case of DCM (Dispersion Compensation Module) elimination, wavelength blockers can be put into the inline amplifier node ILA using a mid-stage access in order to compensate for blocker insertion losses.

Figure 7A:
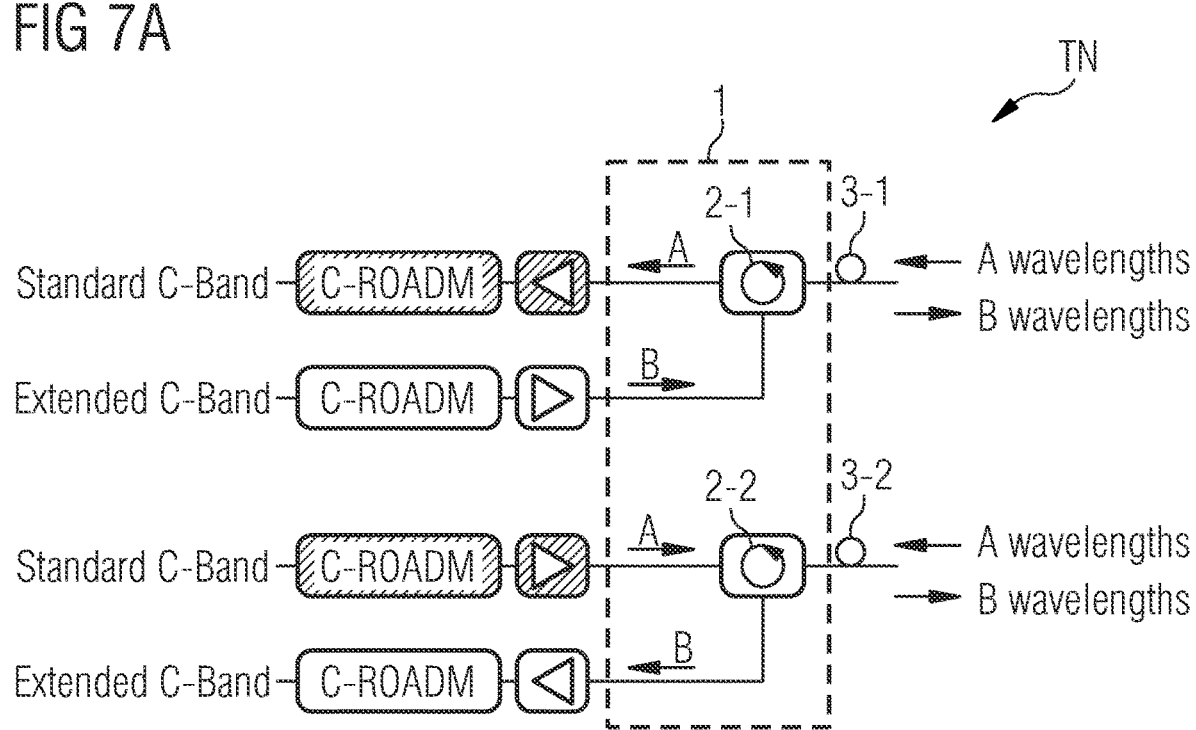
FIGS. 7A, 7B illustrate a possible use case for a method and apparatus according to the present invention.
Figure 7B:
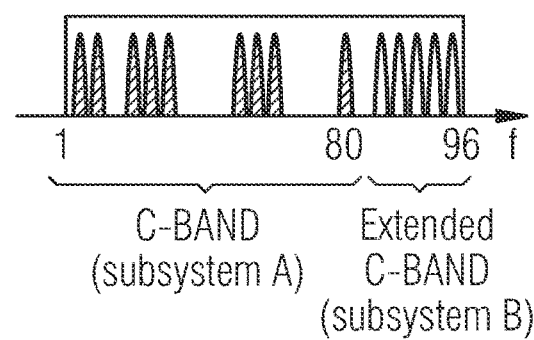

FIGS. 7A, 7B illustrate a possible use case for the system according to the present invention. FIG. 7B shows an example of a spectral coverage for the arrangement illustrated in FIG. 7A. The apparatus 1 according to the present invention can provide an upgrade for a terminal node TN using a standard C-band extended with additional channels. Any WDM systems comprise ROADMs and amplifiers supporting the standard C-band which does typically comprise 80 wavelengths or channels with a 50 GHz spacing according to ITU-T G.694. Recent generation WDM systems support ROADMs and signal amplifiers with flexgrid function and extended C-band coverage which comprises typically 96 channels with a 50 GHz spacing equivalent according to ITU-T G.694. An extension or upgrade can cover different aspects. These aspects comprise a spectral extension of the C-band up to 96 channels, an introduction of a flexgrid function for wavelengths running in a WDM subsystem, the elimination or dispersion compensation for old 10 G channels, and/or the slow migration of services from an existing system to an upgraded system with the goal to eliminate the previous system. Accordingly, as illustrated in the use case of FIGS. 7A, 7B, the WDM subsystems A, B may comprise WDM subsystems for a standard and an extended frequency band.

Figure 8A:
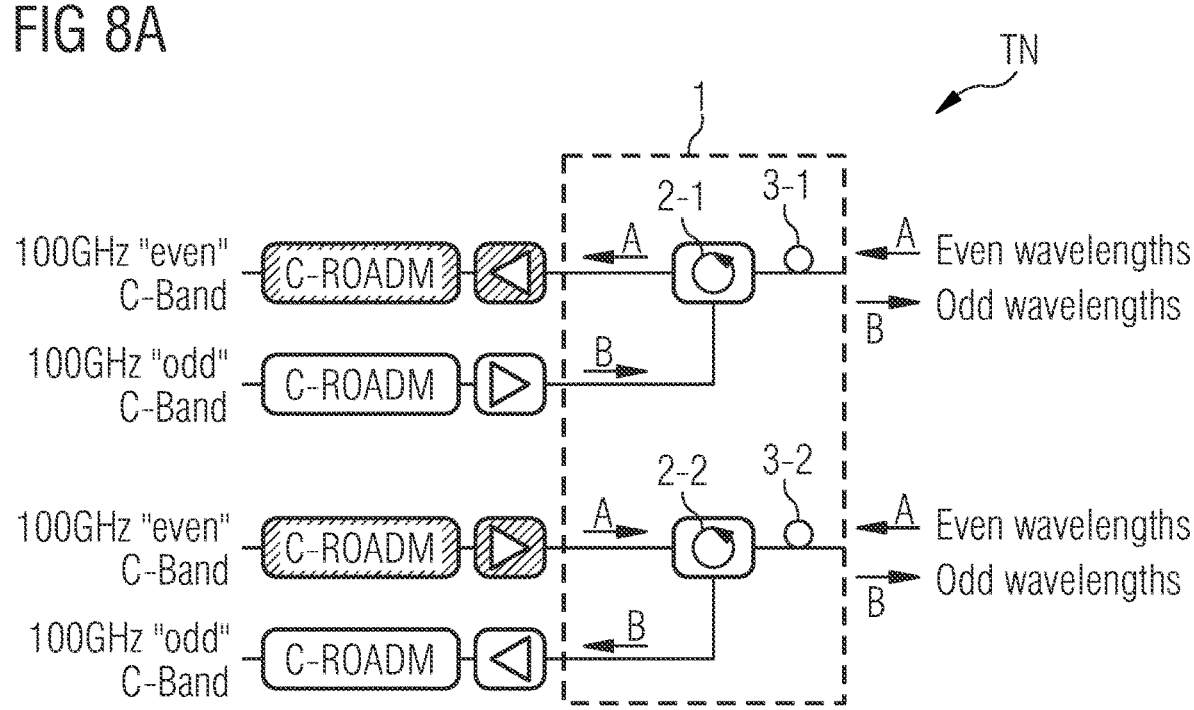
FIGS. 8A, 8B illustrate a further possible exemplary use case for a method and apparatus according to the present invention.
Figure 8B:
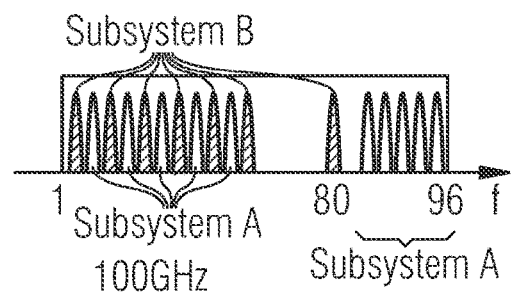

FIGS. 8A, 8B illustrate a further possible use case for an apparatus 1 according to the first aspect of the present invention.

Any deployed WDM subsystems support only a limited number of e.g. 40 channels with a 100 GHz spacing according to ITU-T G.694. However, recent generation WDM systems support ROADMs and amplifiers with a flexgrid function and an extended C-band coverage which may comprise typically 96 channels with a 50 GHz spacing ITU-T G.694. This is also illustrated in the spectrum shown in FIG. 8B. An upgrade of the existing system can cover different aspects. It is possible to provide a spectral extension up to 96 channels also with the introduction of an additional wavelength or channel between every pair of adjacent wavelengths of the previous WDM system. In this way, up to 56 additional 50 GHz channels (40+16) can be provided. As can be seen in the frequency spectrum of FIG. 8B, there are 40 channels with a 100 GHz spacing forming a first WDM subsystem A. This system can be upgraded by inserting a corresponding number of channels in-between the existing channels with a 50 GHz spacing to provide 40 more channels and by extending 16 more channels in the upper frequency spectrum.

Figure 9A:
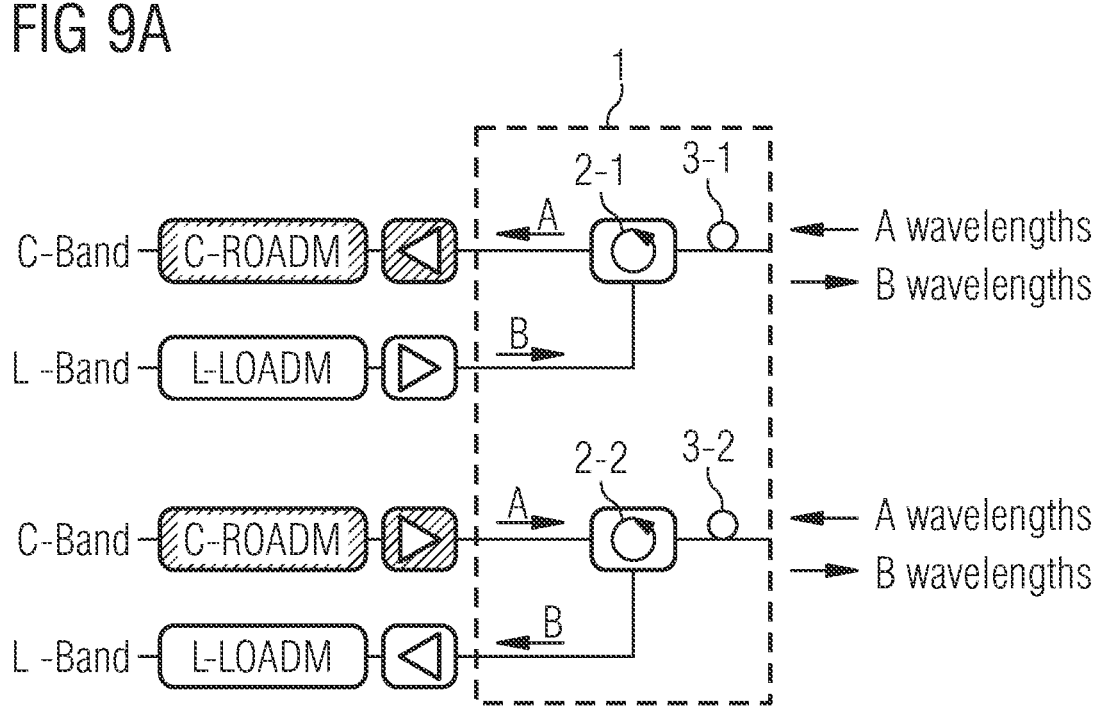
FIGS. 9A, 9B illustrate a further exemplary use case for an apparatus and method according to the present invention.
Figure 9B:
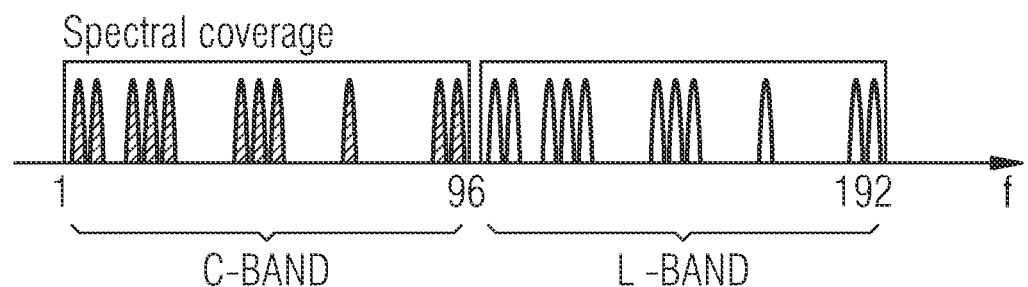

FIGS. 9A, 9B illustrate a further exemplary use case for the method and apparatus 1 according to the present invention. In this example, the existing WDM system is extended by upgrading the C-band with L-band component. The existing C-band WDM system is extended to the L-band on the same optical fiber. Raman energy transferred from the C-band wavelength can be minimized due to the directional coupling. Accordingly, such an upgrade can be done with a minimum impact on an existing C-band WDM system setup.

FIG. 10 shows a further exemplary embodiment of an inline amplifier node ILA used in the WDM system according to the present invention. The inline amplifier node ILA shown in FIG. 10 has the same structure as the inline amplifier node ILA shown in FIG. 6, however, the blocking wavelength components 17, 18, 19, 20 of the inline amplifier node ILA of FIG. 10 are implemented by using conventional C-band or L-band bandpass filters which can be implemented by conventional C-L filters. In the illustrated example, a first WDM subsystem uses the C-band, whereas the other WDM subsystem uses the L-band. Different WDM subsystems, i.e. WDM subsystem A and WDM subsystem B, can be connected to the same fiber using the propagation direction of the wavelength or light as the main criterion to select traffic between the two WDM subsystems. This does reduce optical impairments that can occur when WDM systems with significant wavelength load are coupled to a common fiber infrastructure.

The invention claimed is:

1. An apparatus for management of a spectral capacity of a wavelength division multiplexing, WDM, system comprising at least one pair of transmission fibers provided for transporting optical signals, wherein each transmission fiber of a transmission fiber pair is connected to a first port of an optical circulator having at least two additional ports and adapted to transmit an incoming optical signal entering one of its ports via its next port, wherein WDM subsystems configured with counter-propagating assignable wavelengths are connected to associated ports of the optical circulator of said apparatus, and wherein a first WDM subsystem of the WDM subsystems is configured with a plurality of first wavelengths throughout a first frequency spectrum and a second frequency spectrum higher than the first frequency spectrum, and a second WDM subsystem of the WDM subsystems is configured with a plurality of second wavelengths in the first frequency spectrum, each second wavelength being arranged between each pair of adjacent wavelengths of the plurality of first wavelengths of the first frequency spectrum.

2. The apparatus according to claim 1 comprising a first optical circulator having a first port connected to a first transmission fiber of said transmission fiber pair, a second port connected to a receiving side of the first WDM subsystem and a third port connected to a transmitting side of the second WDM subsystem and a second optical circulator having a first port connected to a second transmission fiber of said transmission fiber pair, a second port connected to a transmitting side of the first WDM subsystem and a third port connected to a receiving side of the second WDM subsystem.

3. The apparatus according to claim 2 wherein the first optical circulator and the second optical circulator comprise a low insertion loss of less than 1 dB.

4. The apparatus according to claim 1 wherein the apparatus is integrated in a terminal node of the WDM system.

5. The apparatus according to claim 4 wherein the apparatus integrated in the terminal node of the WDM system is connected via the pair of transmission fibers and via at least one inline amplifier node of the WDM system to another terminal node of the WDM system.

6. The apparatus according to claim 5 wherein the inline amplifier node of the WDM system comprises for each transmission fiber of a transmission fiber pair connecting the inline amplifier node with a terminal node of the WDM system an optical circulator having a first port connected to the respective transmission fiber and having at least two additional ports and adapted to transmit an incoming optical signal entering one of its ports via its next port.

7. The apparatus according to claim 6 wherein the inline amplifier node of the WDM system comprises a West interface provided to connect the inline amplifier node by means of a first fiber pair to a first terminal node of the WDM system and an East interface provided to connect the inline amplifier node by means of a second fiber pair to a second terminal node of the WDM system.

8. The apparatus according to claim 7 wherein both interfaces of the inline amplifier node comprise for each transmission fiber of the fiber pair connected to the respective interface an associated optical circulator.

9. The apparatus according to claim 8 wherein each interface of the inline amplifier node comprises
    a first optical circulator having a first port connected to a first transmission fiber of the respective fiber pair, a second port adapted to transmit an incoming optical signal received at the first port to an input of a first optical amplifier which is connected to the second port and is adapted to amplify the optical signal received from the second port and having a third port connected to an output of a second optical amplifier and adapted to transmit an amplified optical signal received from the second optical amplifier to the first port of the first optical circulator,
    a second optical circulator having a first port connected to a second transmission fiber of the respective fiber pair, a second port adapted to transmit an incoming optical signal received at the first port to an input of a third optical amplifier which is connected to the second port and is adapted to amplify the optical signal received from the second port and having a third port connected to an output of a fourth optical amplifier and adapted to transmit an amplified optical signal received from the fourth optical amplifier to the first port of the second optical circulator.

10. The apparatus according to claim 9 wherein the output of the first optical amplifier and the output of the third optical amplifier are connected to associated controllable wavelength selective switches, WSS, or associated bandpass filters, wherein the input of the second optical amplifier and the input of the fourth optical amplifier are connected to associated controllable wavelength selective switches, WSS, or associated bandpass filters.

11. The apparatus according to claim 9 wherein the optical amplifiers comprise doped fiber amplifiers.

12. The apparatus according to claim 1 wherein the WDM subsystems comprise WDM subsystems for different predefined frequency bands.

13. The apparatus according to claim 1 wherein the WDM subsystems comprise WDM subsystems for a standard and an extended frequency band.

14. The apparatus according to claim 1 wherein the WDM subsystems comprise WDM subsystems for different non-overlapping sets of WDM carrier frequencies.

15. The apparatus according to claim 1 wherein the WDM subsystems comprise flexgrid WDM subsystems.

16. A wavelength division multiplexing, WDM, system comprising terminal nodes each having an integrated apparatus used for management of a spectral capacity of the wavelength division multiplexing, WDM, system comprising at least one pair of transmission fibers provided for transporting optical signals, wherein each transmission fiber of a transmission fiber pair is connected to a first port of an optical circulator (2) having at least two additional ports and adapted to transmit an incoming optical signal entering one of its ports via its next port,
    wherein WDM subsystems of said wavelength division multiplexing, WDM, system being configured with counter-propagating assignable wavelengths are connected to associated ports of the optical circulator of said apparatus, wherein the terminal nodes are connected with each other via transmission fiber pairs and at least one inline amplifier node of the wavelength division multiplexing, WDM, system, and
    wherein a first WDM subsystem of the WDM subsystems is configured with a plurality of first wavelengths throughout a first frequency spectrum and a second frequency spectrum higher than the first frequency spectrum, and a second WDM subsystem of the WDM subsystems is configured with a plurality of second wavelengths in a first frequency spectrum, each second wavelength being arranged between each pair of adjacent wavelengths of the plurality of first wavelengths of the first frequency spectrum.

17. A method for managing a spectral capacity of a wavelength division multiplexing, WDM, system comprising at least one pair of transmission fibers provided for transporting optical signals, wherein each transmission fiber of a transmission fiber pair is connected to a first port of an optical circulator having at least two additional ports which transmits an incoming optical signal entering one of its ports via its next port, wherein WDM subsystems configured with counter-propagating assigned wavelengths are connected to associated ports of the optical circulator, and
    wherein a first WDM subsystem of the WDM subsystems is configured with a plurality of first wavelengths throughout a first frequency spectrum and a second frequency spectrum higher than the first frequency spectrum, and a second WDM subsystem of the WDM subsystems is configured with a plurality of second wavelengths in the first frequency spectrum, each second wavelength being arranged between each pair of adjacent wavelengths of the plurality of first wavelengths of the first frequency spectrum.

\* \* \* \* \*